United States Patent
Zahlen et al.

(10) Patent No.: US 9,327,821 B2
(45) Date of Patent: May 3, 2016

(54) AIRCRAFT STRUCTURAL ASSEMBLY HAVING AN AREA ELEMENT WHICH COMPRISES A CORE AND AN OUTER LAYER

(71) Applicant: AIRBUS OPERATIONS GMBH, Hamburg (DE)

(72) Inventors: Pierre Zahlen, Stade (DE); Ichwan Zuardy, Hamburg (DE); Markus Mueller, Friedrichshafen (DE); Axel Herrmann, Stade (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 13/779,432

(22) Filed: Feb. 27, 2013

(65) Prior Publication Data

US 2013/0306794 A1    Nov. 21, 2013

Related U.S. Application Data (63) Continuation of application No. PCT/EP2011/004144, filed on Aug. 17, 2011.

(60) Provisional application No. 61/378,009, filed on Aug. 30, 2010.

(30) Foreign Application Priority Data

Aug. 30, 2010   (DE) .......................... 10 2010 035 787

(51) Int. Cl.
*B64C 1/18* (2006.01)
*B64C 1/06* (2006.01)
(Continued)

(52) U.S. Cl.
CPC ... *B64C 1/18* (2013.01); *B64C 1/00* (2013.01); *B64C 1/068* (2013.01); *B64C 1/12* (2013.01); *Y10T 428/24612* (2015.01)

(58) Field of Classification Search
CPC ............ B64C 1/20; B64C 1/18; B64D 11/00; B64D 2011/0644; B64D 9/00; B64D 9/003
USPC .................................. 244/118.5, 118.1, 118.2
See application file for complete search history.

(56) References Cited

U.S. PATENT DOCUMENTS 3,837,985 A * 9/1974 Chase ........................... 428/223
3,846,203 A * 11/1974 Immethun ............... E04C 2/284
                                                           156/265

(Continued)

FOREIGN PATENT DOCUMENTS

| CN | 101432190 | 5/2009 |
|---|---|---|
| DE | 31 41 869 | 5/1983 |

(Continued)

OTHER PUBLICATIONS

English machine translation of specification to DE 102005045181, as disclosed by Applicant.*

(Continued)

*Primary Examiner* — Tien Dinh
*Assistant Examiner* — Alexander V Giczy
(74) *Attorney, Agent, or Firm* — Dickinson Wright PLLC (57) ABSTRACT

An aircraft structural assembly includes an area element which has a core and an outer layer. A first surface of the area element is convexly curved, at least in certain sections, relative to an imaginary central area of the area element extending through the core of the area element. By contrast, a second surface of the area element located opposite the first surface is oriented, at least in certain sections, parallel to the imaginary central area of the area element extending through the core of the area element. The area element is configured in the form of a floor panel of a floor system. The first or the second surface of the area element is designed to form a walkable floor surface of the floor system in the state of the aircraft structural assembly when mounted in an aircraft.

14 Claims, 6 Drawing Sheets

(51) Int. Cl.
  *B64C 1/12*     (2006.01)
  *B64C 1/00*     (2006.01)

(56) References Cited

U.S. PATENT DOCUMENTS

| | | | |
|---|---|---|---|
| 4,479,621 A | | 10/1984 | Bergholz |
| 5,624,622 A | * | 4/1997 | Boyce et al. ................. 264/258 |
| 7,100,885 B2 | * | 9/2006 | Zerner ....................... 248/503.1 |
| 8,205,832 B2 | | 6/2012 | Schroeer |
| 8,869,673 B2 | * | 10/2014 | Townsend et al. .......... 89/36.01 |
| 2004/0055248 A1 | | 3/2004 | Grillos |
| 2004/0195446 A1 | * | 10/2004 | Smallhorn ................. 244/118.5 |
| 2006/0038071 A1 | * | 2/2006 | Schoene .................... 244/118.6 |
| 2006/0188696 A1 | * | 8/2006 | Grose et al. ................... 428/156 |
| 2007/0193146 A1 | * | 8/2007 | Carstensen ........... B64D 9/003 52/268 |
| 2008/0173755 A1 | * | 7/2008 | Benthien ............. B60P 7/0807 244/118.1 |
| 2009/0184199 A1 | * | 7/2009 | Leisten et al. ................ 244/1 A |
| 2010/0044510 A1 | | 2/2010 | Schroeer |
| 2010/0213314 A1 | | 8/2010 | Haselmeier |
| 2011/0212291 A1 | * | 9/2011 | Buellesbach ................... 428/99 |

FOREIGN PATENT DOCUMENTS

| | | |
|---|---|---|
| DE | 101 45 276 | 7/2003 |
| DE | 10 2005 045 181 | 4/2007 |
| DE | 10 2007 062 111 | 7/2009 |
| DE | 10 2008 060 550 | 6/2010 |
| GB | 613512 | 11/1948 |
| GB | 1 311 202 | 3/1973 |
| WO | 2010/110964 | 9/2010 |

OTHER PUBLICATIONS

International Search Report dated Sep. 1, 2012.
English Translation of Chinese Office Action dated Nov. 15, 2014.
Chinese Office Action dated May 26, 2015.

* cited by examiner

AIRCRAFT STRUCTURAL ASSEMBLY HAVING AN AREA ELEMENT WHICH COMPRISES A CORE AND AN OUTER LAYER

CROSS REFERENCE TO RELATED APPLICATIONS

This application is bypass continuation of PCT/EP2011/004144 filed Aug. 17, 2011 which is entitled to and claims the benefit of German Application No. DE 10 2010 035 787.1 and U.S. Provisional Application No. 61/378,009, both filed Aug. 30, 2010, the disclosures of which, including the specification, drawings and abstract, are incorporated herein by reference in their entirety.

FIELD

The invention relates to an aircraft structural assembly having an area element which comprises a core and an outer layer, which outer layer can comprise, for example, an upper and a lower covering skin.

BACKGROUND

In modern commercial aircraft, structural assemblies, such as, for example, the fuselage shell, individual fuselage shell segments or a floor system of the aircraft, usually have a multipart construction, in which one or more area element(s) is/are connected to a stiffening or support structure formed separately from the area element(s), in order to give the structural assembly the required structural stiffness and buckling stability. In a fuselage shell or a fuselage shell segment, the components referred to here as area elements are formed, for example, by the shell elements defining the aircraft outer skin and the stiffening or support structure is formed by the ribs and/or stringers of the aircraft structure. By contrast, a conventional aircraft floor system comprises, for example, area elements configured in the form of floor panels which are mounted on a support structure comprising a plurality of transverse supports extending parallel to one another and perpendicularly to the longitudinal axis of the aircraft. Such an aircraft floor system is described, for example, in DE 10 2007 062 111 A1.

The floor system known from DE 10 2007 062 111 A1 and serving to separate a passenger cabin from a cargo compartment arranged below the passenger cabin comprises a transverse support structure composed of metal or a carbon fibre reinforced plastic (CFRP). Floor panels designed with a sandwich construction are mounted on the transverse support structure. Screws passing through the floor panels serve to fasten the floor panels to the individual transverse supports of the transverse support structure. Furthermore, ceiling panels of a cargo compartment ceiling which extend parallel to the floor panels and are likewise designed with a sandwich construction are fastened to the transverse support structure.

DE 10 2005 045 181 A1, by contrast, discloses an aircraft floor system having floor panels which are formed from a fibre composite material and are formed in one piece with support elements of a transverse or longitudinal support structure. The floor panels comprise a plane covering plate which is adhesively bonded, in the region of its underside facing away from a walkable floor surface, to the support elements of a transverse or longitudinal support structure.

SUMMARY

The invention is directed at the object of specifying an aircraft structural assembly which is distinguished by a low weight and simple mountability, but at the same time also has a sufficient mechanical stability and stiffness.

This object is achieved by an aircraft structural assembly having features of attached claims and an aircraft structural assembly having the features of attached claims. According to a first embodiment, an aircraft structural assembly according to the invention comprises an area element having a core and an outer layer. The outer layer can completely surround the core. Alternatively to this, however, a configuration of the area element in which the outer layer covers only partial regions of the core is also conceivable. A first surface of the area element is convexly curved, at least in certain sections, relative to an imaginary central area of the area element extending through the core of the area element, it being possible for the central area of the area element extending through the core of the area element to be configured in the form of a planar plane or in the form of a curved plane. By contrast, a second surface of the area element located opposite the first surface is oriented, at least in certain sections, parallel to the imaginary central area of the area element extending through the core of the area element. The area element thus has a cross-sectional area varying over its surfaces.

The area element of the aircraft structural assembly according to the invention can be convexly curved in the region of its entire first surface relative to the imaginary central area of the area element. Alternatively to this, however, a configuration of the area element in which merely sections of the first surface are convexly curved relative to the imaginary central area of the area element is also conceivable. By contrast, other sections of the first surface of the area element can extend parallel to the imaginary central area of the area element and consequently parallel to the second surface of the area element. The area element is configured in the form of a floor panel of a floor system, the first or the second surface of the area element being designed to form a walkable floor surface of the floor system in the state of the aircraft structural assembly when mounted in an aircraft.

The area element constructed with a sandwich construction enables good heat and sound insulation and therefore contributes to increased comfort for the passengers and the crew on board the aircraft when it is used as a floor panel of an aircraft floor system. At the same time, a mechanically stable floor panel is created by the configuration of the area element with the first surface convexly curved relative to the imaginary central area of the area element. In particular, the area element configured with a convexly curved first surface is distinguished by a good resistance to impact loads. The area element thus meets the strength, stiffness and impact resistance requirements placed on a floor panel of a floor system in an aircraft, without it being necessary to mount the area element on a transverse support structure used in conventional aircraft floor systems.

Rather, in an aircraft floor system in which area elements configured in the form of floor panels and having a first surface convexly curved relative to the imaginary central area of the area element are used as floor panels, an additional support structure can be dispensed with. The aircraft structural assembly according to the invention is therefore notable for a particularly low weight. Furthermore, the structural assembly can be mounted simply and quickly, since it is no longer necessary to mount firstly a transverse support structure and subsequently fasten the floor panels of the floor system to the individual support elements of the transverse support structure. Instead, it is sufficient to mount merely the area elements of the aircraft structural assembly according to the invention which are configured in the form of floor panels at their desired position in the aircraft.

Preferably, the second surface of the area element oriented, at least in certain sections, parallel to the imaginary central area of the area element extending through the core of the area element is designed to form a walkable floor surface of the floor system in the state of the aircraft structural assembly when mounted in an aircraft. Preferably, in such a configuration of the aircraft structural assembly according to the invention, the imaginary central area of the area element extending through the core of the area element and the second surface of the area element oriented parallel to the central area are of planar form, at least in certain sections, in order to form a planar walkable floor surface of the floor system.

By contrast, the first surface of the area element convexly curved relative to the imaginary central area of the area element extending through the core of the area element is preferably designed to form an underside of the area element, configured in the form of a floor panel, facing away from the walkable floor surface of the floor system in the state of the aircraft structural assembly when mounted in an aircraft. In a preferred embodiment of the structural assembly, the first surface of the area element is furthermore designed such that it is suitable for forming a ceiling surface of a region of the aircraft arranged below the floor system, so that an additional ceiling covering can be dispensed with in this aircraft region. As a result, further weight savings and greater ease of mounting can be achieved.

The area element of the aircraft structural assembly according to the invention can comprise a connecting device for connecting the area element to a first end of a supporting rod. The supporting rod, which can be configured, for example, in the form of a Samer rod, is preferably fastened at its second end to a rib of an aircraft structure. The supporting rod can be composed of metal or of a fibre composite material, for example carbon fibre reinforced plastic. Similarly, the rib of the aircraft structure can be composed of metal or a fibre composite material, for example carbon fibre reinforced plastic. The connecting device can comprise, for example, a recess which is formed in the first surface of the area element and in which the first end of the supporting rod is received. This recess can be lined with a stiffening structure made of metal or a fibre composite material, for example carbon fibre reinforced plastic. Furthermore, the connecting device can comprise suitable fastening means, such as, for example, screws, rivets or the like, for fastening the area element to the first end of the supporting rod. Preferably, the area element comprises at least two connecting devices which serve in each case to connect the area element to a first end of a supporting rod, the second end of which is fastened to a rib of the aircraft structure.

A fastening rail for fixing a seat or a structural monument to the area element can be integrated into the core of the area element. In the state of the aircraft structural assembly when mounted in an aircraft, the fastening rail preferably extends substantially parallel to a longitudinal axis of the aircraft. If required, it is of course also possible to integrate a plurality of fastening rails into the core of the area element, which rails can be arranged parallel to one another and at a desired distance from one another. It is understood that a receiving region of the fastening rail provided for cooperation with a seat or a structural monument is arranged in the region of the second surface of the area element which forms a walkable floor surface of the floor system in the state of the aircraft structural assembly when mounted in an aircraft. The fastening rail integrated into the core of the area element can be supported by a supporting element likewise integrated into the core of the area element. Preferably, the supporting element extends parallel to the fastening rail, i.e. in the state of the aircraft structural assembly when mounted in an aircraft, the supporting element is preferably oriented parallel to the longitudinal axis of the aircraft. The supporting element can be configured, for example, in the form of a H-profile. The supporting element can be composed of metal or a fibre composite material, for example carbon fibre reinforced plastic.

According to a second embodiment of the invention, an aircraft structural assembly comprises an area element having a core and an outer layer, it being possible for the outer layer again to completely enclose the core or be applied only to partial regions of the core. Again, a first surface of the area element is convexly curved, at least in certain sections, relative to an imaginary central area of the area element extending through the core of the area element. Furthermore, a second surface of the area element located opposite the first surface is oriented, at least in certain sections, parallel to the imaginary central area of the area element extending through the core of the area element. Again, the central area of the area element extending through the core of the area element can be configured in the form of a planar plane or in the form of a curved plane.

However, the area element is now configured in the form of an outer structural element, i.e. as a covering (fairing, streamlined surfacing) of an aircraft fuselage shell, an aircraft fuselage shell segment of an aircraft box structure. The aircraft box structure or aircraft box-beam structure can be configured in the form of an aircraft wing, an aircraft tail unit or the like or form part of an aircraft wing, an aircraft tail unit or the like. The first or the second surface of the area element is designed to form an inner surface of the aircraft fuselage shell, the aircraft fuselage shell segment or the aircraft box structure, facing an interior space of the aircraft fuselage shell, the aircraft fuselage shell segment or the aircraft box structure, in the state of the aircraft structural assembly when mounted in an aircraft.

Preferably, the second surface of the area element oriented, at least in certain sections, parallel to the imaginary central area of the area element extending through the core of the area element is designed to form an inner surface of the aircraft fuselage shell, the aircraft fuselage shell segment or the aircraft box structure, facing an interior space of the aircraft fuselage shell, the aircraft fuselage shell segment or the aircraft box structure, in the state of the aircraft structural assembly when mounted in an aircraft. The central area of the area element extending through the core of the area element and the second surface of the area element oriented parallel to the central area can be of planar, but also curved form, at least in certain sections.

By contrast, the first surface of the area element convexly curved relative to the imaginary central area of the area element extending through the core of the area element is preferably designed to form an aircraft outer skin. The first surface of the area element convexly curved relative to the imaginary central area of the area element can form an outer layer of the aircraft outer skin. Alternatively to this, however, a further aircraft outer skin layer can be applied to the first surface of the area element, so that the first surface of the area element forms merely an aircraft outer skin layer. Just like the area element configured in the form of a floor panel, the area element configured in the form of an aircraft fuselage shell, an aircraft fuselage shell segment or the aircraft box structure is, owing to its sandwich construction, also distinguished by a good sound and heat insulation ability. Moreover, the first surface of the area element convexly curved relative to the central area of the area element again ensures a high mechanical strength, in particular a high impact resistance of the area element. Consequently, the aircraft fuselage shell or the aircraft fuselage shell segment can be produced without stringers or with a small number of stringers. Supporting structural components can also be dispensed with in an aircraft box structure. As a result, considerable weight savings can be achieved. Furthermore, the mounting of the aircraft fuselage shell, the aircraft fuselage shell segment or the aircraft box structure is simplified. As for the rest, all the optional features and advantages described in connection with an area element configured in the form of a floor panel are applicable to an area element configured in the form or an outer structural element provided for use in an aircraft fuselage shell, an aircraft fuselage shell segment or an aircraft box structure.

The curvature of the first surface of the area element convexly curved relative to the imaginary central area of the area element extending through the core of the area element is preferably adapted, in dependence on the shape and dimensions of the area element, to the desired curvature of the aircraft outer skin formed by the first surface of the area element.

Irrespective of whether an area element an aircraft structural assembly according to the invention is configured in the form of a floor panel of an aircraft floor system or in the form an outer structural element of an aircraft fuselage shell, an aircraft fuselage shell segment or an aircraft box structure, a receiving space for receiving electrical lines, fluid lines, such as, for example, water lines, gas lines, fuel lines or other lines, can be formed in the core of the area element. The lines integrated into the core of the area element are particularly well protected from mechanical loads. Furthermore, a receiving space for receiving a diagnostic line can be formed in the core of the area element, which line serves to detect any damage to the core of the area element and transmit corresponding signals indicating damage of the core of the area element to a suitable control device.

The core of the area element can furthermore have core regions strengthened by strengthening elements integrated into the core. The strengthening elements can be configured in the form of separate components made of metal or a fibre composite material, for example carbon fibre reinforced plastic. Alternatively to this, however, it is also conceivable to strengthen the core material of the area element itself. In the case of area elements which are used as shell elements of a fuselage shell or a fuselage shell segment, the use of strengthening elements integrated into the core is advantageous in particular in heavily loaded or weak regions of the area elements, for example in regions of the area element provided with window openings.

The core of the area element is preferably composed of a foam material. For example, a polymethacrylimide foam, which can be formed as a closed-cell foam, can be used to produce the core of the area element. The outer layer of the area element is preferably composed of a fibre composite material, for example carbon fibre reinforced plastic, with the result that a high strength, stiffness and impact resistance of the outer layer and at the same time a low weight can be achieved. The outer layer is preferably connected to the core via an interface layer. A resin layer, in particular an epoxy resin layer or an epoxy amine resin layer, for example, can serve as the interface layer. The core of the area element can extend over the entire area region of the area element. Preferably, however, the area element has an area region in which the area element is not provided with a core. In the area region of the area element not provided with a core, the first and the second surface of the area element preferably extend parallel to one another and optionally also parallel to the imaginary central area. If desired, the first and the second surface of the area element can be formed as plane surfaces in the area region of the area element not provided with a core.

The area region of the area element not provided with a core can be of monolithic construction and be composed, for example, of a monolithic fibre composite material, for example carbon fibre reinforced plastic material. Alternatively to this, however, the area region of the area element not provided with a core can also be formed by two outer layers extending parallel to one another and connected to one another, for example, via an interface layer.

The area region of the area element not provided with a core preferably extends along at least a section of a peripheral edge of the area element. An area region which is not provided with a core and extends along a peripheral edge of the area element ensures a stiffening of the area element. Furthermore, the area element can be connected, in the region of its area region not provided with a core, to an adjacent area element. The aircraft structural assembly according to the invention can comprise a plurality of area elements which are connected to an adjacent area element along an area region of the area elements not provided with a core. The area regions of adjacent area elements not provided with a core can be positioned in overlapping or abutting manner and be connected by means of a suitable joining method. For example, a connection of mutually adjacent area elements by adhesive bonding, screwing, riveting or the like is possible. Alternatively to this, however, it is also conceivable to form mutually adjacent area elements integrally, so that additional connecting elements for connecting the area elements to one another can be dispensed with. Furthermore, the area elements can be connected, in the region of their area region not provided with a core, to further aircraft components. For example, a connection of the area elements to an aircraft structural component, for example a rib of an aircraft structure, is possible.

BRIEF DESCRIPTION OF DRAWINGS

Preferred embodiments of the invention will now be explained in more detail with the aid of the appended schematic drawings, of which

DETAILED DESCRIPTION OF EMBODIMENTS

Figure 1A:
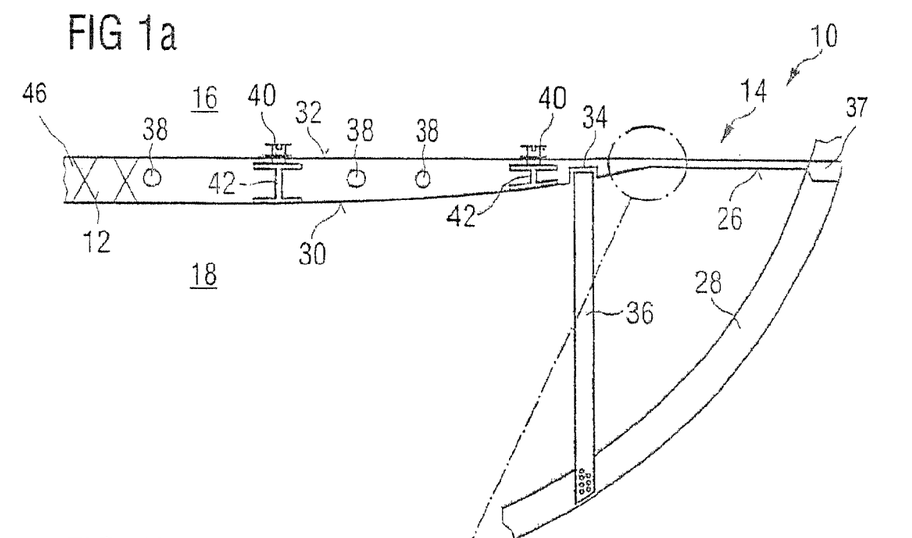
FIGS. 1a and 1b show an aircraft structural assembly having an area element configured in the form of a floor panel of an aircraft floor system.
Figure 1B:
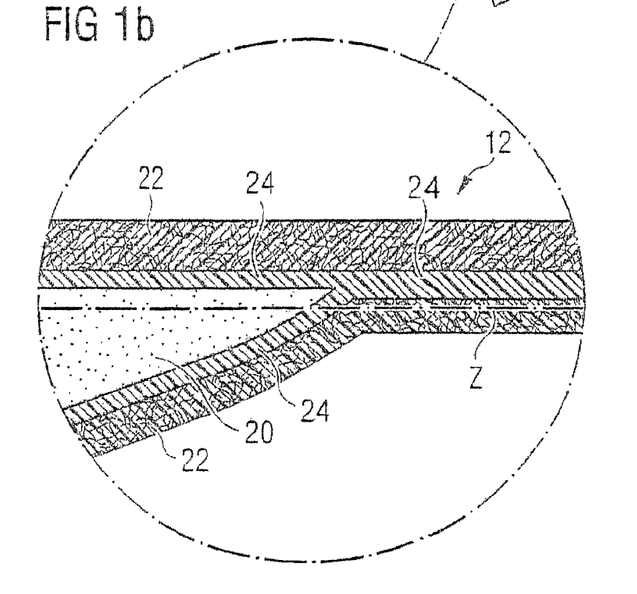
Figure 2A:
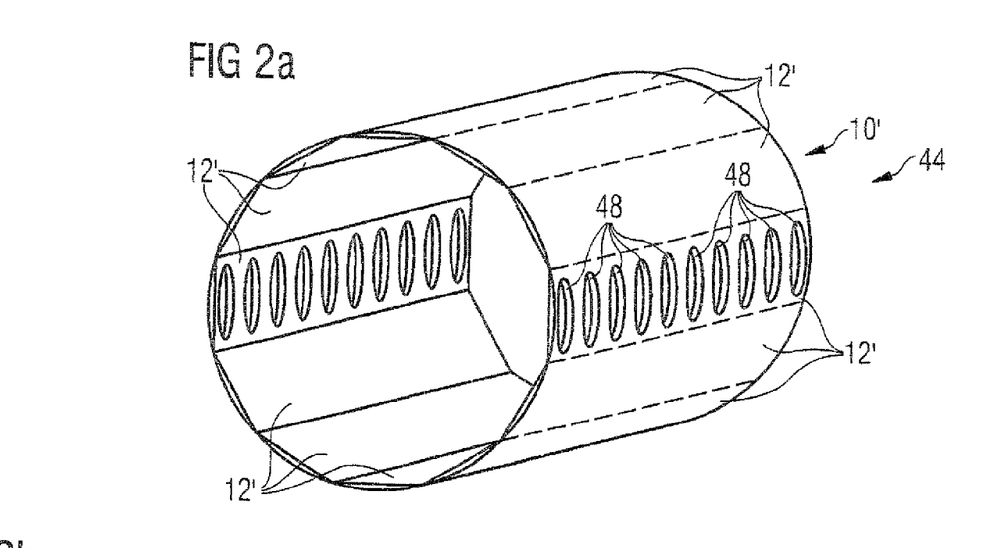
FIG. 2a shows an aircraft structural assembly having area elements configured in the form of outer structural elements of an aircraft fuselage shell segment.
Figure 2B:
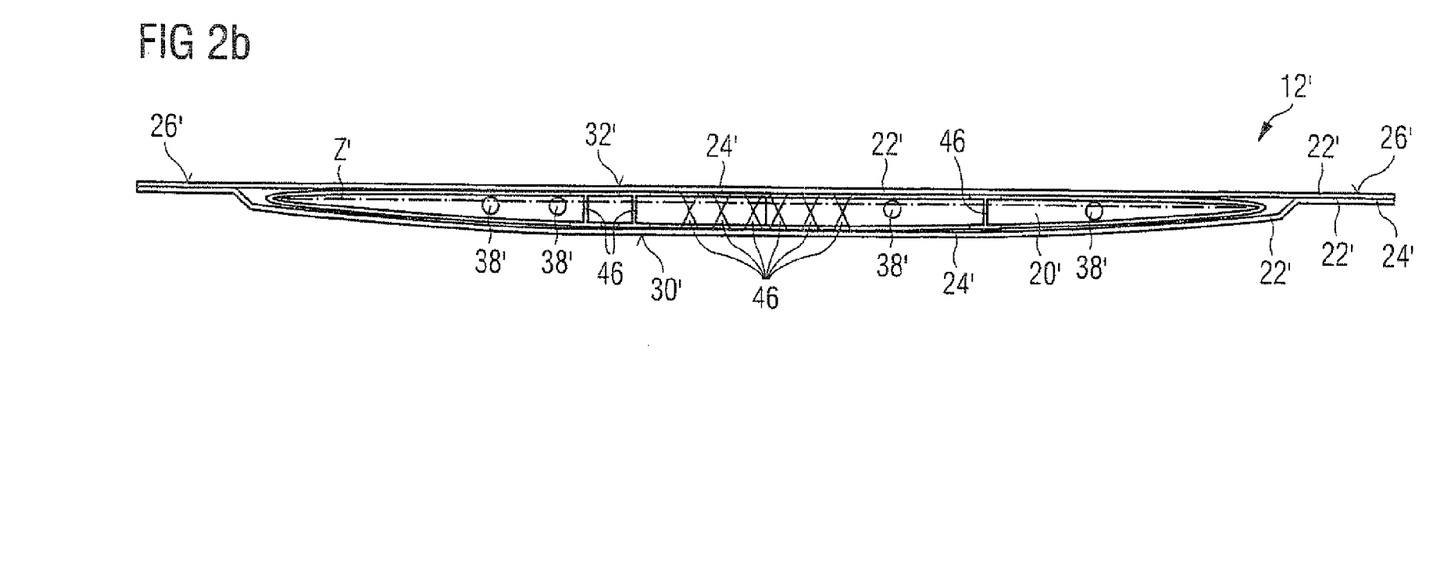
FIGS. 2b to 2d show detail illustrations of different embodiments of area elements configured in the form of outer structural elements of an aircraft fuselage shell segment.
Figure 2C:
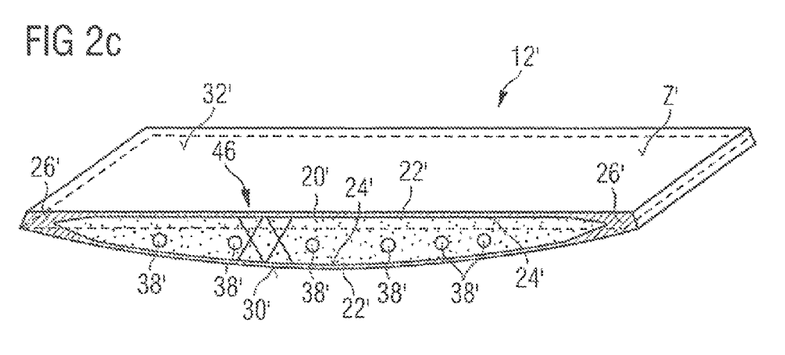
Figure 2D:
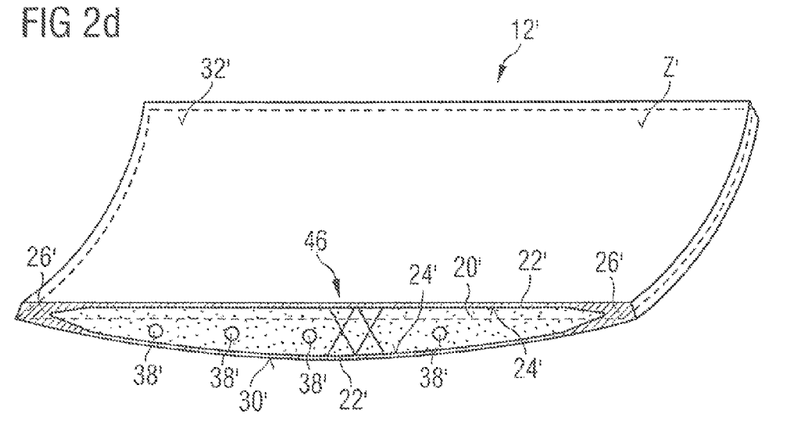

FIGS. 1a and 1b show a first embodiment of an aircraft structural assembly 10. The aircraft structural assembly 10 comprises an area element 12 which is configured in the form of a floor panel of a floor system 14. In the embodiment shown, the floor system 14 serves to separate a passenger cabin 16 from a cargo compartment 18 located below the passenger cabin 16. It is understood, however, that the floor system 14 can, of course, also be used to separate two passenger decks in a wide-body aircraft arranged one above the other.

As can best be seen in the detail illustration of FIG. 1b, the area element 12 is designed, at least in certain sections, with a sandwich construction and comprises a core 20 composed of a closed-cell foam material. To produce the core 20, a polymethacrylimide foam, for example, can be used. An area element 12 provided with such a foam core 20 is distinguished by excellent heat and sound insulation properties. Furthermore, the area element 12 comprises an outer layer 22 which completely encloses the foam core 20. The outer layer 22 is composed of carbon fibre reinforced plastic, which is distinguished by a high mechanical strength, a high stiffness and a high impact resistance. The outer layer 22 thus ensures, on the basis of its material properties alone, that the area element 12 has overall a good mechanical strength and a high stiffness. The outer layer 22 is connected to the core 20 via an interface layer 24. In the embodiment shown, the interface layer 24 is composed of an RTM6 resin from Hexcel.

The core 20 does not, however, extend over the entire area region of the area element 12. Rather, the area element 12 has an area region 26 in which the area element 12 is not provided with a core 20. The area region 26 of the area element 12 extends along a peripheral edge of the area element 12 and, in the embodiment shown, consists of two outer layers 22 extending parallel to one another and connected to one another via an interface layer 24. Alternatively to this, however, the area region 26 can also be of monolithic design and be composed, for example, of a monolithic carbon fibre reinforced plastic material. The area region 26 extending along the entire peripheral edge of the area element 12 ensures a further stiffening of the area element 12. Furthermore, the area element 12 can be connected in the region of its area region 26 to an adjacent area element 12. For this purpose, the area regions 26 of adjacent area elements can be positioned in overlapping or abutting manner and be connected to one another by means of a suitable joining method. For example, a connection of mutually adjacent area elements 12 is possible by adhesive bonding, screwing, riveting or the like. Furthermore, the area elements 12 can be connected, in the region of their area region 26 not provided with a core 20, to further aircraft components. For example, in the floor system illustrated in FIGS. 1a and 1b, a connection of the area element 12 in the region of its area region 26 to an aircraft structural component, for example a rib 28 of the aircraft structure, is possible.

The area element 12 has a first surface 30 and a second surface 32 located opposite the first surface 30. The first surface 30 of the area element 12 is convexly curved, in the area region of the area element 12 provided with a core 20, relative to an imaginary plane central area Z extending through the core 20 of the area element 12 (see FIG. 1b). By contrast, the second surface 32 of the area element 12 located opposite the first surface 30 is oriented parallel to the imaginary central area Z of the area element 12 extending through the core 20 of the area element 12, i.e. the second surface 32 of the area element 12 has a plane form.

The plane second surface 32 of the area element 12 oriented parallel to the plane central area Z forms a walkable floor surface of the floor system 14 in the state of the area element 12, illustrated in FIG. 1a, when mounted in an aircraft. By contrast, the first surface 30 of the area element 12 convexly curved relative to the central area Z forms an underside of the floor system 14 facing away from the second surface 32 of the area element 12 forming a walkable floor surface of the floor system 14. Only in the area region 26 of the area element 12 not provided with a core 20 do the first and the second surface 30, 32 of the area element 12 extend parallel to one another and parallel to the imaginary central area Z, i.e. the first and the second surface 30, 32 of the area element 12 are configured as plane surfaces in the area region 26 of the area element 12 not provided with a core 20.

Figure 5A:
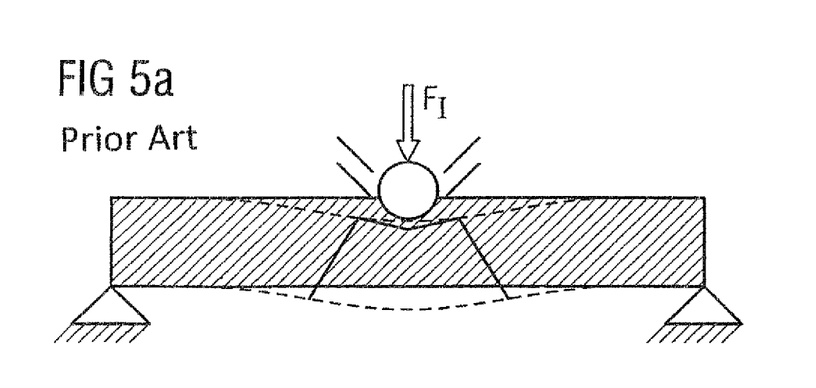
FIGS. 5a and 5b shows cross-sectional illustrations of area elements known from the prior art, on which an impact load is acting.
Figure 5B:
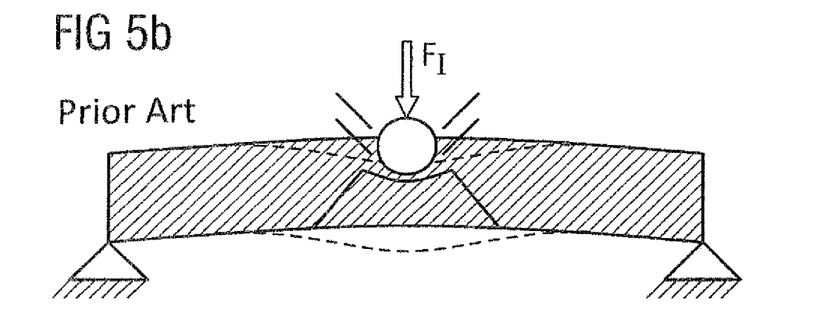
Figure 5C:
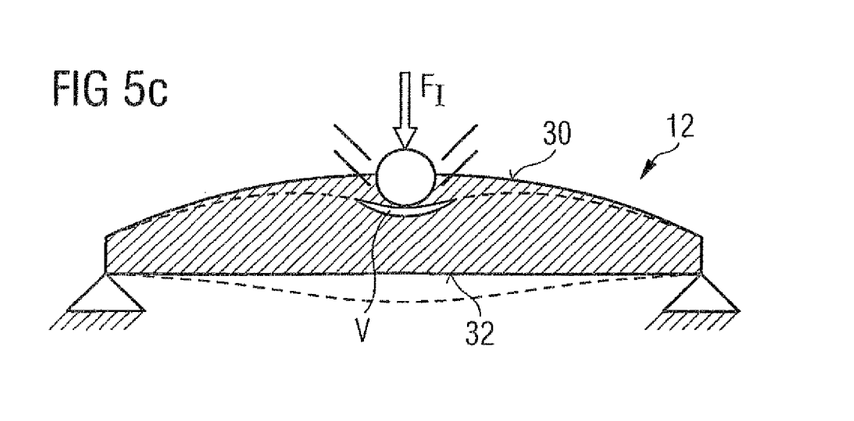
FIG. 5c shows a cross-sectional illustration of an area element provided for use in an aircraft structural assembly according to FIG. 1a, 2a, 4a or 4b, on which an impact load is acting.

As can be seen from the schematic illustrations in FIGS. 5a to 5c, the first surface 30 of the area element 12 convexly curved relative to the central area Z is distinguished by a markedly improved impact resistance compared with a plane surface. The improved impact resistance of a curved surface results from the fact that an impact resistance force counteracting an impact force Fi has a component directed directly opposite the impact force Fi. As a result of the configuration with a first surface 30 convexly curved relative to the central area Z, the damage tolerance and in particular the impact resistance of the area element 12 can thus be considerably improved compared with an area element configured with two plane surfaces.

Furthermore, the area element 12 provided with a first surface 30 convexly curved relative to the central area Z and consequently a varying cross-sectional area and varying core thickness exhibits, in the event of an impact load, a deformation behaviour which differs markedly from the deformation behaviour of a sandwich structure with a constant cross-sectional area and constant core thickness. A sandwich structure with a constant cross-sectional area and constant core thickness is deformed only slightly in the event of an impact load, i.e. only a small part of the impact energy is converted into bending deformation energy. Instead, the majority of the impact energy acting on the sandwich structure is converted into "crushing energy", resulting in a plastic deformation of the core and, depending on how high the impact load is, possibly also a shear fracture of the core.

By contrast, in the case of the area element 12 provided with a convexly curved first surface 30 and consequently a varying cross-sectional area and varying core thickness, an impact load results in a large-area, possibly area-covering deformation of the entire structure. Consequently, the majority of the impact energy acting on the area element 12 in the event of an impact load can be converted into bending deformation energy (see dashed contour lines of the area element in FIG. 5c), i.e. with corresponding support the area element 12 is more flexible than a sandwich structure with a constant cross-sectional area and constant core thickness. Although the part of the impact energy acting on the area element 12 which is not converted into bending deformation energy can still result in a small-area crushing or plastic deformation V of the core 20, damage which substantially impairs the strength and stability of the area element 12 can be avoided, or at least kept less significant than is possible with known sandwich structures with a constant cross-sectional area and constant core thickness. The floor system 14 can thus be designed without an additional main-load-bearing transverse support structure and is therefore distinguished by a particularly low weight and simple mountability.

In the embodiment shown, the first surface 30 of the area element 12 convexly curved relative to the central area Z is designed such that it is suitable for forming a ceiling surface of the cargo compartment 18. As a result, an additional ceiling covering of the cargo compartment 18 can be dispensed with. This enables further weight savings and greater ease of mounting.

As can be seen from FIG. 1a, the area element 12 is provided with a connecting device 34 which serves to connect the area element 12 to a first end of a supporting rod 36. The connecting device 34 is integrated into the core 20 of the area element 20 and comprises a receiving device for receiving the first end of the supporting rod 36. A second end of the supporting rod 36 is fastened to the rib 28 of the aircraft structure. Furthermore, the area element 12, or the area region 26 of the area element 12 not provided with a core 20, is fixed to the rib 28 via a connecting element 37. Although FIG. 1a shows only one connecting device 34, only one supporting rod 36 and only one connecting element 37, it is understood that the area element 12 can be provided with a further connecting device 34 and a further supporting rod 36 can be present in order to ensure an areal support of the area element 12 on the rib 28 of the aircraft structure. Furthermore, the area element 12 can be connected, via a further connecting element 37, to a section of the rib 28 located opposite the section of the rib 28 shown in FIG. 1a.

Furthermore, in the core of the area element 12 there are formed a plurality of receiving spaces 38 which serve to receive electrical lines, fluid lines, etc. Furthermore, a diagnostic line is run through at least one of the receiving spaces 38, which line is designed to monitor the structural integrity of the core 20 of the area element 12. Signals transmitted by the diagnostic line are supplied to a control device (not illustrated in the figures), so that the control device can detect any structural damage to the core 20 of the area element 12 on the basis of the signals transmitted to it by the diagnostic line.

Finally, there are integrated into the core 20 of the area element 12 fastening rails 40 for fixing a seat or a structural monument to the area element 12. It is understood that the fastening rails 40 are arranged in the region of the second surface 32 of the area element 12 which forms a walkable floor surface of the floor system 14 in the state of the floor system 14 when mounted in an aircraft. The fastening rails 40 extend substantially parallel to a longitudinal axis of the aircraft in the state of the floor system 14 when mounted in an aircraft.

The fastening rails 40 are each supported by a supporting element 42 integrated into the core 20 of the area element 12. In the embodiment shown, the supporting elements 42 are configured in the form of a H-profile. The supporting elements 42 are composed of a carbon fibre reinforced plastic and thus ensure a stiffening of the area element 12 in the region of the fastening rails 40, without increasing the weight of the area element 12 inappropriately. If desired or required, the core 20 of the area element 12 can have further core regions strengthened by strengthening elements integrated into the core 20.

FIGS. 2a to 2d show a further embodiment of an aircraft structural assembly 10' which comprises a plurality of area elements 12'. The basic construction of the area elements 12' corresponds to the basic construction of the area element 12 described above, i.e. the area elements 12' comprise, just like the area element 12, a foam core 20 which is connected via a resin interface layer 24 to an outer layer 22 made of carbon fibre reinforced plastic. Moreover, the area elements 12' have, just like the area element 12, along their peripheral edge an area region 26' in which the area elements 12' are not provided with a core 20', but are composed of two outer layers 22' connected to one another via an interface layer 24'. Finally, each area elements 12' comprises, just like the area element 12, a first surface 30' which is convexly curved, in the area region of the area element 12' provided with a core 20', relative to an imaginary central area Z' of the area element 12' extending through the core 20' of the area element 12'. By contrast, a second surface 32' of the area element 12' located opposite the first surface 30' extends parallel to the central area Z', it being possible for the central area Z' and the second surface 32' to be of plane form (see FIGS. 2b and 2c) or curved form (see FIG. 2d).

Unlike the area element 12, however, the area elements 12' are not configured in the form of a floor panel, but in the form of a shell element of a fuselage shell segment 44. In other words, the fuselage shell segment 44 illustrated in FIG. 2a consists of a plurality of area elements 12' connected to one another and configured in the form of shell elements. The connection of mutually adjacent area elements 12' to one another is effected in the region of the area regions 26' of the area elements 12' in which the area elements 12' are not provided with a core 20'.

Figure 3A:
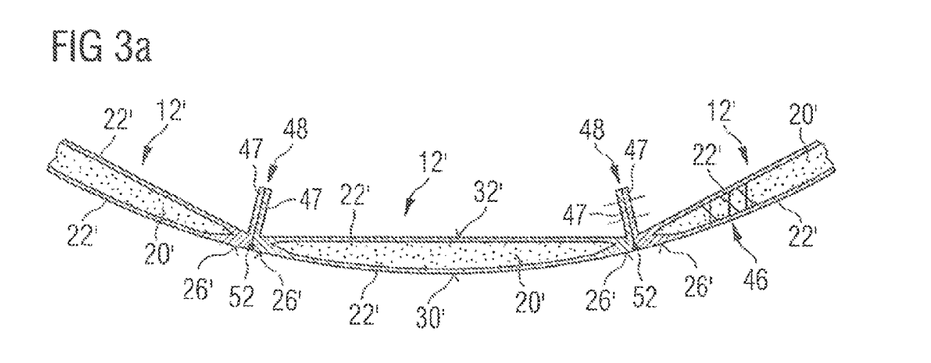
FIGS. 3a to 3c show three alternatives for the connection of two mutually adjacent area elements of the aircraft structural assembly according to FIG. 2a, FIGS. 4a and 4b show two different embodiments of an aircraft structural assembly having area elements configured in the form of outer structural elements of an aircraft box structure.
Figure 3B:
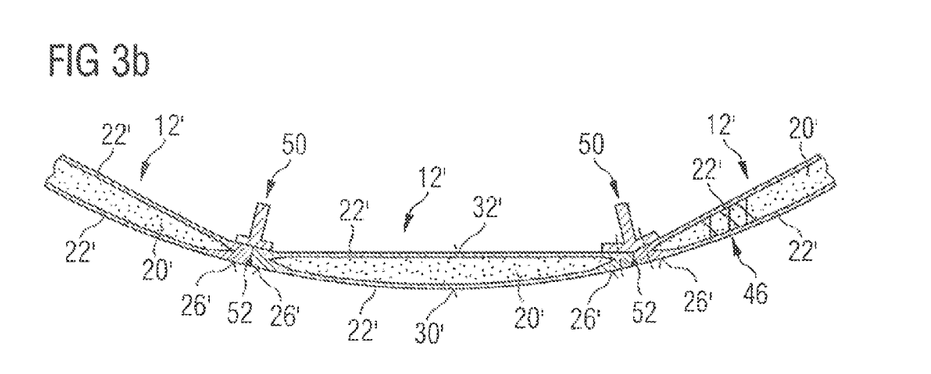
Figure 3C:
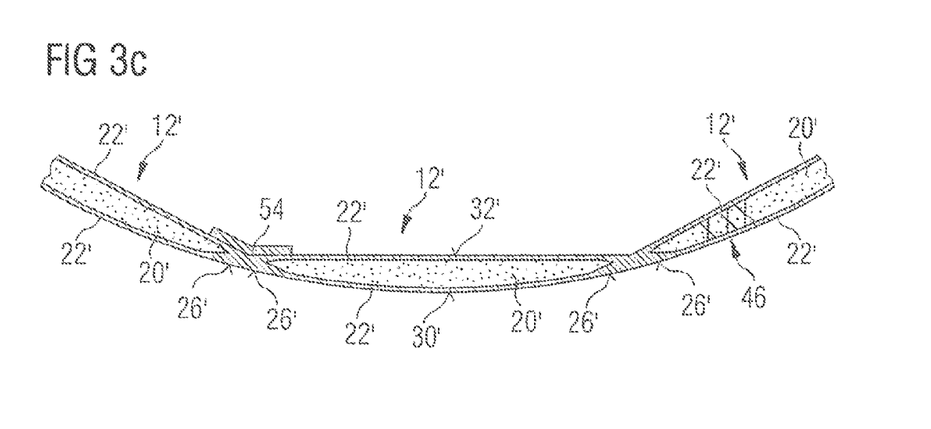

The area regions 26' of the area elements 12' can, as described above, be arranged in an overlapping or abutting manner and connected to one another by a suitable joining method, for example by adhesive bonding, riveting or the like. FIG. 3a shows three mutually adjacent area elements 12', the area regions 26' of which each have a section 47 extending at an angle of about 90° to the second surface 32' and are connected to one another in the region of this section 47 by an adhesive bonding or riveting connection 48. FIG. 3b, by contrast, shows two adjacent area elements 12' arranged in abutment which are connected to one another by means of a T-doubler 50. A seal 52 serves in each case to seal the joint between the mutually adjacent area elements 12'. Finally, FIG. 3c illustrates area elements 12' formed integrally with one another. The area elements 12' shown in FIG. 3c are produced by a one-shot production process and are therefore more difficult to produce than the area elements 12' produced as individual parts according to FIGS. 3a and 3b. However, additional connecting elements for connecting mutually adjacent area elements 12' can be dispensed with. If desired or required, the area elements 12' formed integrally with one another can be provided, in their area regions 26' or in sections of their area regions 26', with strengthening elements 46 which ensure a stiffening of the border regions between mutually adjacent area elements 12'.

The first surface 30' of each area element 12' convexly curved relative to the central area Z' of the area element 12' forms an aircraft outer skin in the state of the fuselage shell segment 44 when mounted in an aircraft. It is understood that the first surface 30' of the area elements 12' can form merely a layer of the aircraft outer skin and, if desired or required, can be provided with an additional surface layer. In dependence on the shape and dimensions of the area elements 12', the curvature of the first surface 30' is adapted in each case to the desired curvature of the aircraft outer skin formed by the first surface 30'.

Receiving spaces 38' for receiving electrical lines, fluid lines or diagnostic lines are again formed in the core 20' of the area elements 12'. Moreover, strengthening elements 46 are integrated into the core 20' of the area elements 12' if required, by means of which strengthening elements strengthened core regions are produced. For example, it is particularly appropriate to strengthen with strengthening elements 46 area elements 12' which are provided with window openings 48 and are thereby structurally weakened. The area elements 12' are notable, just like the area element 12, for a high mechanical strength, a high stiffness and in particular an excellent impact resistance. An aircraft provided with a fuselage shell segment 44 illustrated in FIG. 2a can therefore have an aircraft structure which comprises no stringers (longitudinal supports extending parallel to the longitudinal axis of the aircraft) or markedly fewer stringers than the structures of aircraft provided with conventional fuselage shell segments. Once again, a considerable weight saving can thereby be achieved and the mounting of the fuselage shell segment 44 can be considerably simplified. At the same time, excellent heat and sound insulation properties are achieved as a result of the sandwich construction of the area elements 12' with a foam core 20'. As for the rest, all the optional features and advantages described in connection with the area element 12 configured in the form of a floor panel are applicable to an area element 12' configured in the form of a shell element provided for use in a fuselage shell segment 44.

Figure 4A:
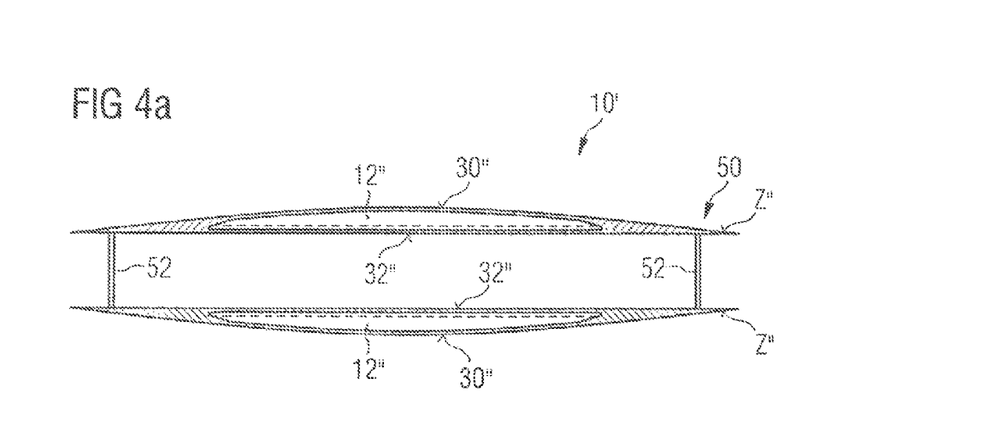
Figure 4B:
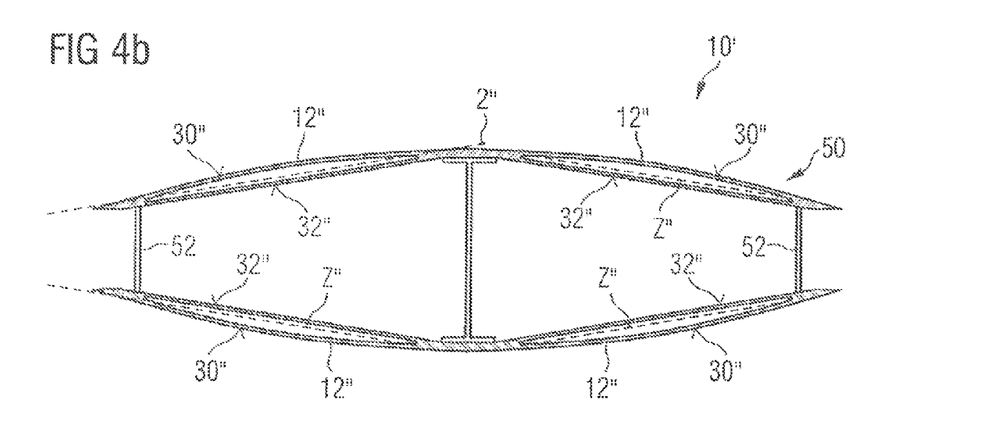

FIGS. 4a and 4b show a further embodiment of an aircraft structural assembly 10' which comprises a plurality of area elements 12". The basic construction of the area elements 12" corresponds to the basic construction of the area elements 12, 12' described above, i.e. the area elements 12" comprise, just like the area elements 12, 12', a foam core which is connected via a resin interface layer to an outer layer made of carbon fibre reinforced plastic. Moreover, the area elements 12" have, just like the area elements 12, 12', along their peripheral edge an area region in which the area elements 12" are not provided with a core, but are composed of two outer layers connected to one another via an interface layer. Finally, each area elements 12" comprises, just like the area elements 12, 12', a first surface 30" which is convexly curved, in the area region of the area element 12" provided with a core, relative to an imaginary central area Z" of the area element 12" extending through the core of the area element 12". By contrast, a second surface 32" of the area element 12" located opposite the first surface 30" extends parallel to the central area Z".

Unlike the area element 12 or the area elements 12', however, the area elements 12" are not configured in the form of a floor panel or in the form of outer structural elements of a fuselage shell segment 44, but in the form of outer structural elements of an aircraft box structure 50. The aircraft box or box-beam structure 50 can form a wing, a tail unit or another box-shaped aircraft structural component or part of such a box-shaped aircraft structural component. In the embodiments of an aircraft box structure 50 shown in FIGS. 4a and 4b, the area elements 12" are connected to one another via connecting struts 52 extending between the area elements 12". If desired or required, however, the connecting struts 52 can also be replaced by further area elements 12". A connection of adjacent area elements 12" is possible, as described above in connection with the area elements 12'.

The first surface 30" of each area element 12" convexly curved relative to the central area Z" forms an aircraft outer skin in the state of the aircraft box structure 50 when mounted in an aircraft. It is understood again that the first surface 30" of the area elements 12" can form merely a layer of the aircraft outer skin and, if desired or required, can be provided with an additional surface layer. In dependence on the shape and dimensions of the area elements 12", the curvature of the first surface 30" is adapted in each case to the desired curvature of the aircraft outer skin formed by the first surface 30". Receiving spaces for receiving electrical lines, fluid lines or diagnostic lines are again formed in the core of the area elements 12". Moreover, strengthening elements are integrated into the core of the area elements if required, by means of which strengthening elements strengthened core region are produced.

The area elements 12" are notable, just like the area element 12 and the area elements 12', for a high mechanical strength, a high stiffness and in particular an excellent impact resistance. An aircraft box structure 50 illustrated in FIG. 4a or 4b can therefore have fewer or no stringers. Once again, a considerable weight saving can thereby be achieved and the mounting of the aircraft box structure 50 can be considerably simplified. At the same time, excellent heat and sound insulation properties are achieved as a result of the sandwich construction of the area elements 12" with a foam core. As for the rest, all the optional features and advantages which were described above in connection with the area elements 12, 12' configured in the form of a floor panel or a shell element are applicable to the area element 12" forming an outer structural element of an aircraft box structure 50.

The invention claimed is:

1. Aircraft structural assembly having an area element which comprises a core and an outer layer, wherein:
   a first surface of the area element, when seen from the outside of the area element, is convexly curved relative to an imaginary central area of the area element extending through the core of the area element, and
   a second surface of the area element located opposite the first surface is oriented parallel to the imaginary central area of the area element extending through the core of the area element,
   the area element being configured in the form of a floor panel of a floor system,
   the second surface of the area element being structured to form a walkable floor surface of the floor system when the aircraft structural assembly is mounted in an aircraft, and
   the area element of the aircraft structural assembly being convexly curved in the region of the entire first surface of the area element relative to the imaginary central area of the area element,
   wherein the area element has at least one area region not provided with a core,
   wherein the area region not provided with a core extends along a section of a peripheral edge of the area element,
   wherein a plurality of fastening rails for fixing one of a seat and a structural monument to the area element is integrated into the core of the area element, the plurality of fastening rails including one of the at least one outermost fastening rails located closest to one of the area region not provided with a core, and
   wherein the area element comprises a connecting device that connects the area element to a first end of a supporting rod for connecting the area element to the aircraft structure, the connecting device being integrated into the core at a location of the core that is adjacent to but spaced apart from the area region not provided with a core and between the one of the at least one outermost fastening rails and the area region not provided with a core.

2. Aircraft structural assembly according to claim 1,
   wherein the second surface of the area element oriented parallel to the imaginary central area of the area element extending through the core of the area element is designed to form a walkable floor surface of the floor system when the aircraft structural assembly is mounted in an aircraft, and
   wherein the first surface of the area element convexly curved relative to the imaginary central area of the area element extending through the core of the area element is designed to form an underside of the floor system facing away from the second surface of the area element forming a walkable floor surface of the floor system when the aircraft structural assembly is mounted in an aircraft.

3. Aircraft structural assembly according to claim 1,
wherein the supporting rod has a second end fastened to a rib of an aircraft structure.

4. Aircraft structural assembly according to claim 1,
wherein the fastening rail is supported by a supporting element integrated into the core of the area element.

5. Aircraft structural assembly according to claim 1,
wherein a receiving space for receiving electrical lines, fluid lines or diagnostic lines is formed in the core of the area element.

6. Aircraft structural assembly according to claim 1,
wherein the core of the area element has core regions strengthened by strengthening elements integrated into the core.

7. Aircraft structural assembly according to claim 1,
wherein the core of the area element is composed of a foam material and the outer layer of the area element is composed of a fibre composite material, the outer layer being connected to the core via an interface layer.

8. Aircraft structural assembly according to claim 1,
wherein the area region of the area element not provided with a core is of monolithic construction or comprises a plurality of outer layers connected to one another.

9. Aircraft structural assembly according to claim 1,
comprising a plurality of area elements which are connected to one another along the respective area region of the area elements not provided with a core.

10. Aircraft structural assembly having an area element which comprises a core and an outer layer, wherein:
a first surface of the area element, when seen from outside of the area element, is convexly curved relative to an imaginary central area of the area element extending through the core of the area element, and
a second surface of the area element located opposite the first surface is oriented parallel to the imaginary central area of the area element extending through the core of the area element,
the area element being configured in the form of a floor panel of a floor system,
the second surface of the area element being structured to form a walkable floor surface of the floor system when the aircraft structural assembly is mounted in an aircraft,
the area element having at least one area region not provided with a core,
in the area region not provided with a core, the first and the second surface of the area element extend parallel to one another and parallel to the imaginary central area, and
the area region not provided with a core is of monolithic construction or comprises a plurality of outer layers connected to one another,
wherein the area region not provided with a core extends along a section of a peripheral edge of the area element,
wherein a plurality of fastening rails for fixing one of a seat and a structural monument to the area element is integrated into the core of the area element, the plurality of fastening rails including one of the at least one outermost fastening rails located closest to one of the area region not provided with a core, and
wherein the area element comprises a connecting device that connects the area element to a first end of a supporting rod for connecting the area element to the aircraft structure, the connecting device being integrated into the core at a location that is adjacent to but spaced apart from the area region not provided with a core and between the one of the at least one outermost fastening rails and the area region not provided with a core.

11. Aircraft structural assembly according to claim 10,
wherein the second surface of the area element oriented parallel to the imaginary central area of the area element extending through the core of the area element is designed to form a walkable floor surface of the floor system when the aircraft structural assembly is mounted in an aircraft, and
wherein the first surface of the area element convexly curved relative to the imaginary central area of the area element extending through the core of the area element is designed to form an underside of the floor system facing away from the second surface of the area element forming a walkable floor surface of the floor system when the aircraft structural assembly is mounted in an aircraft.

12. Aircraft structural assembly according to claim 10,
wherein a receiving space for receiving electrical lines, fluid lines or diagnostic lines is formed in the core of the area element.

13. Aircraft structural assembly according to claim 10,
wherein the core of the area element has core regions strengthened by strengthening elements integrated into the core.

14. Aircraft structural assembly according to claim 10,
wherein the core of the area element is composed of a foam material and the outer layer of the area element is composed of a fibre composite material, the outer layer being connected to the core via an interface layer.

* * * * *